J. J. ROWE.
FLANGED WHEEL.
APPLICATION FILED MAR. 27, 1920.
1,369,839.
Patented Mar. 1, 1921.
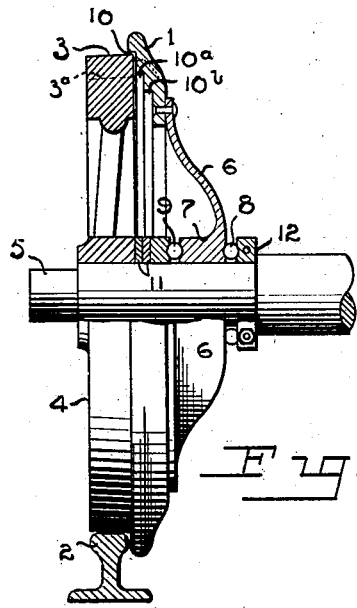
Fig I.
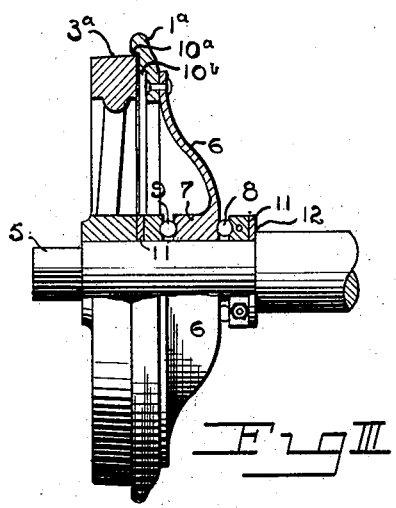
Fig III.
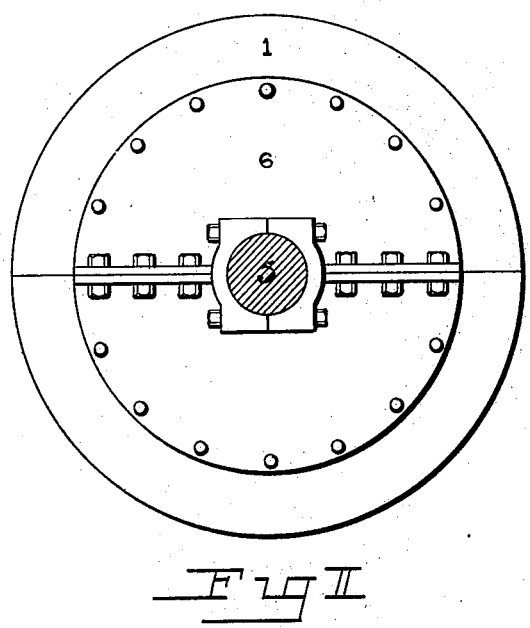
Fig II.
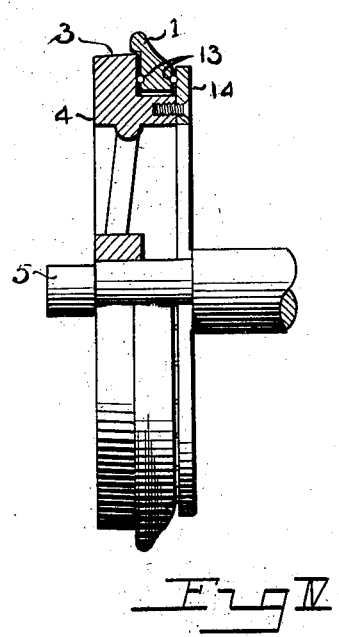
Fig IV.
Inventor:
John Jones Rowe
per H. W. Plucker
Attorney.

UNITED STATES PATENT OFFICE.

JOHN JONES ROWE, OF DURBAN, NATAL, SOUTH AFRICA, ASSIGNOR OF ONE-THIRD TO JOSEPH ST. GUIDO REYNOLDS-TAIT AND ONE-THIRD TO JOHN BURNETT HOBDAY, BOTH OF DURBAN, NATAL, SOUTH AFRICA.

FLANGED WHEEL.

1,369,839.  Specification of Letters Patent.  Patented Mar. 1, 1921.

Application filed March 27, 1920. Serial No. 369,362.

*To all whom it may concern:*

Be it known that I, JOHN JONES ROWE, a British subject, and resident of 39 South Ridge road, Durban, Province of Natal, Union of South Africa, have invented certain new and useful Improvements in Flanged Wheels, of which the following is a specification.

The present invention has reference to flanged wheels for rail tracks in which the flange and tread members are capable of relative rotation. The invention provides a construction in which the parts are formed to prevent bodies from entering between the flange and the tread members and which allows for re-forming said members as they become worn.

In the accompanying drawing,

Figure I is an end view, partly in section, of a wheel constructed according to the invention.

Fig. II is a face view.

Fig. III is a similar view to Fig. I showing the wheel after it has been worn and re-dressed.

Fig. IV shows a modified construction.

1 indicates the flange member relatively rotatable to the disk 4 and having a tread 3 which runs on the rail 2. In the example shown in Figs. I and II the wheel disk 4 is rigid with the axle 5. The flange 1 is a ring riveted to a dished disk 6 having a central hub 7 which is free to rotate on the axle 5. The disk 6 is held in the desired position, with relation to the wheel disk 4, by means of a thrust bearing 8, and, if desired, an opposite thrust bearing 9 which coöperates with bearing 8 to balance the disk 6. The flange is formed with a recess 10 into which the tread enters, so that the extremity of the flange overlaps the space between the flange and the wheel disk and prevents bodies from entering between them. In use, the disks 4 and 6 can rotate together when the tread 3 only is in contact with the rail 2. When the flange 1 also comes into contact with the rail, it assumes whatever rotational speed involves the least frictional resistance between itself and the rail.

The construction shown provides for reforming the tread and flange as these parts become worn away. For this purpose the flange 1 is formed with several recesses 10, $10^a$, $10^b$ stepped radially inward and also back from the wheel disk 4. Provision is also made for advancing the thrust bearings 8, 9 outwardly along the axle, by, for instance, removable distance pieces 11 which are equal in width to the depth of each of the recesses 10, $10^a$, $10^b$ and which can be shifted from their original position between the wheel disk 4 and the thrust bearing 9 to a new position between the thrust bearing 8 and its thrust shoulder 12 on the axle. When the tread 3 has become worn, it may be dressed down to a fresh peripheral surface indicated by $3^a$. The flange 1 is similarly dressed to provide a fresh and smaller flange surface $1^a$. The wheel is then reassembled with one of the distance pieces 11 transferred as described to bring the second recess $10^a$ over the new tread surface.

In the modified construction shown in Fig. IV the flange 1 is a ring rotatably mounted by thrust bearings 13 between the wheel disk 4 itself and a retaining ring 14 bolted to the wheel disk.

The invention is applicable to existing wheels by removing the existing flange therefrom and fitting a separately rotatable flange as described. When it is desired to fit or remove the separate flange without withdrawing the wheel disk from its axle, the separate flange 1, the flange disk 6 and like added parts are made in bolted halves as indicated in Fig. II.

I claim:—

1. In a flanged car wheel, the combination of a wheel disk providing a tread, a separate flange member rotatable independently of the wheel disk, said flange member axially overlapping the tread, and means to retain the wheel disk and flange against axial separation.

2. In a flanged car wheel, the combination with an axle, of a wheel disk thereon providing a tread, a separately rotatable flange member, said flange member having a series of stepped recesses to receive the tread, and adjustable means to hold the flange member axially with regard to the wheel disk.

In testimony thereof I affix my signature.

JOHN JONES ROWE.

Witness:
M. M. MASTERSON.